United States Patent [19]

Ganseuer et al.

[11] 4,344,605
[45] Aug. 17, 1982

[54] APPARATUS FOR CUTTING THE END OFF A COILED STRIP

[75] Inventors: Horst Ganseuer, Kreuztal-Eichen; Dieter Remus, Netphen; Heinz Gail, Hilchenbach, all of Fed. Rep. of Germany

[73] Assignee: Siemag Transplan GmbH, Netphen, Fed. Rep. of Germany

[21] Appl. No.: 287,044

[22] Filed: Jul. 27, 1981

[30] Foreign Application Priority Data

Jul. 28, 1980 [DE] Fed. Rep. of Germany ....... 3028538
Jun. 5, 1981 [EP] European Pat. Off. .......... 81 104360

[51] Int. Cl.³ .............................................. B23K 7/10
[52] U.S. Cl. ...................................... 266/48; 83/649; 242/56 R; 242/65; 242/78.7; 266/57
[58] Field of Search ............... 266/48, 50, 57; 83/649; 242/56 R, 78.7, 65

[56] References Cited
U.S. PATENT DOCUMENTS 3,463,474 8/1969 Muller et al. .......................... 266/57

Primary Examiner—W. Stallard
Attorney, Agent, or Firm—Karl F. Ross

[57] ABSTRACT

An apparatus for cutting the end off a metal strip wound as a coil having a diameter lying between a predetermined maximum diameter and a predetermined minimum diameter has a fixed support, a substantially horizontal support cradle for the coil on the support, a cutter on the support defining a vertically open gap spaced from the cradle for cutting the strip along a horizontal cutting plane as the strip passes down through the gap, and a guide on the support above and to one side of the gap between same and the cradle. An inner pivot arm is pivoted on the support about a horizontal inner axis and has an outer end on which is pivoted an outer pivot arm about a horizontal outer axis and having an outer end carrying a pusher, and an actuator connected between the arms and the support or frame for displacing this pusher horizontally and vertically above the plane of the cutter relative to the guide for urging the pusher against the strip at the guide at any of several vertically offset locations therealong.

12 Claims, 4 Drawing Figures

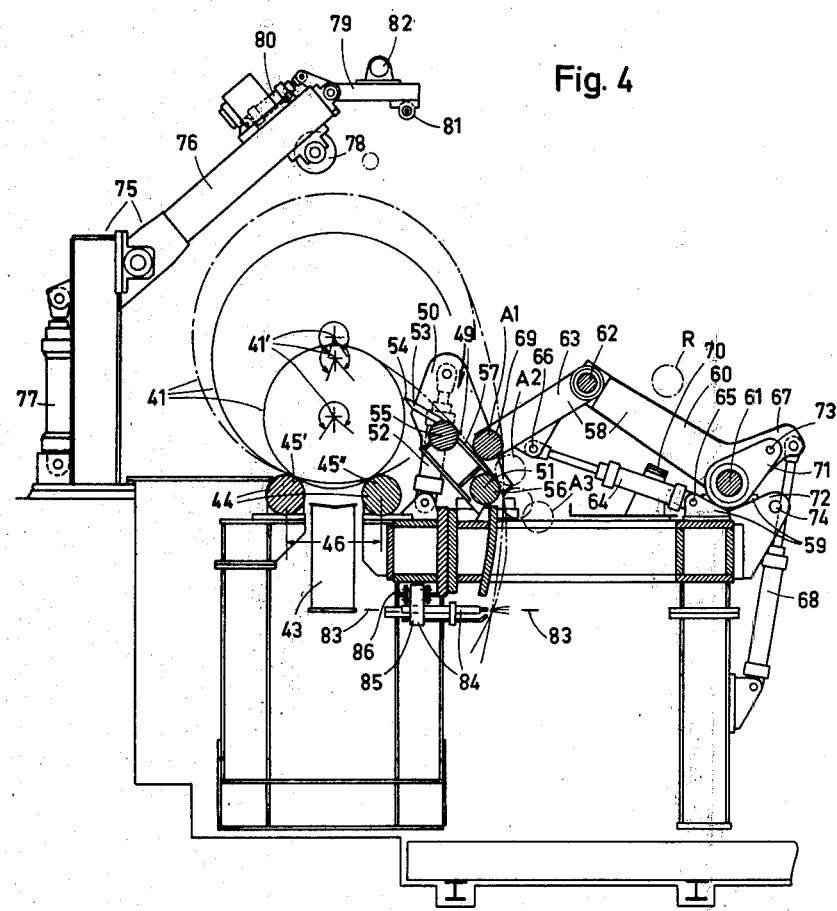

APPARATUS FOR CUTTING THE END OFF A COILED STRIP

FIELD OF THE INVENTION

The present invention relates to an apparatus for cutting the end off a coiled strip. More particularly this invention concerns such an apparatus employed for cutting test pieces off a coiled normally metallic strip.

BACKGROUND OF THE INVENTION

It is known, as for example from German pat. application No. 2,924,379, to cut the end off a coiled metal strip by means of an apparatus provided with a coil-supporting cradle provided with a shear. The cradle is formed of a pair of cradle rollers spaced apart by a distance smaller than the diameter of the smallest coil expected to be encountered by the apparatus. The shear works in a horizontal plane below the coil so that feeding the strip to it is aided by gravity, and so that the cut-off end portions fall naturally away from the balance of the strip.

This guide arrangement normally comprises a guide table that can be tipped to align itself tangentially with the outer surface of the coil or roll of strip. Several rollers are juxtaposed with this guide table and serve to keep the strip in the proper orientation for the shear, so that a square end is produced, as is necessary for various later operations that might be carried out on the cut-off piece.

The apparatus is normally provided with some drive arrangement for the coil in the cradle so that, after a sample piece has been cut off, the balance can be wound back up. A strap is typically wound around the recoiled strip to keep it in position once it is wound up. This type of rewind device is particularly useful in an arrangement used for severing off strip pieces for testing.

Normally the strip is guided between the cradle and the shear by a complex set of guide rollers that insure that it enters the shear at a right angle, even though the coils may vary from between 1.0 m and 2.3 m in diameter. These guide rollers must be displaceable toward and away from the guide and are normally spaced vertically apart.

The main problem with this type of machine is that it is quite complex. This makes it expensive to manufacture, and normally makes maintenance a problem. The complex machinery that is provided around the shear makes servicing of any of this structure rather difficult.

OBJECTS OF THE INVENTION

It is therefore an object of the present invention to provide an improved apparatus for cutting the end off a strip wound on a coil.

Another object is the provision of such a machine which is relatively simple so that it can be produced at relatively low cost and can be serviced relatively easily.

A further object is to provide such a machine which is substantially more versatile than the prior-art such machines.

SUMMARY OF THE INVENTION

These objects are attained according to the instant invention in an apparatus of the above-described general type which comprises a fixed support, a substantially horizontal support cradle for the coil on the support, means on the support defining a vertically open gap spaced from the cradle for cutting the strip along a horizontal cutting plane as the strip passes down through the gap, and a guide on the support above and to one side of the gap between same and the cradle. According to the instant invention, an inner pivot arm is pivoted on the support about a horizontal inner axis and has an outer end on which is pivoted an outer pivot arm about a horizontal outer axis and having an outer end carrying a pusher, and means connected between the arms and the support or frame for displacing this pusher horizontally and vertically above the plane of the cutter relative to the guide for urging the pusher against the strip at the guide at any of several vertically offset locations therealong.

Thus with the system according to the instant invention this pusher can fulfill several functions. In fact this pusher can do everything done by several different pieces of machinery on the prior-art system, simply by moving it into the appropriate position.

According to further features of this invention, the apparatus has two such inner arms and two such outer arms. The pusher is a horizontal pusher roller interconnecting the outer ends of the outer arms. The apparatus further comprises a rigid horizontal pivot interconnecting the outer ends of the inner arms, so that the arms, pusher roller, and pivot form a rigid linkage. The inner arms are parallel to each other and the outer arms are parallel to each other.

In accordance with yet another feature of this invention, means is provided for rotating one of the guide rollers. In addition, the pusher roller is displaceable between a first position between the guide rollers and engaged against said strip so that the strip between the pusher and guide rollers is straightened thereby, a second position pinching the strip against the one guide roller so that the strip is positively advanced by the one guide roller, a third position below both of the guide rollers and engaged against the strip, and a fourth rest position out of engagement with the strip and spaced from the guide. Thus the single pusher roller according to this invention can be made to perform any of several different tasks, or can be moved completely out of the way for easy servicing or repair.

According to this invention, means is provided including a stop for limiting the downward displacement of the pusher roller to a level above the plane of the cutter. Thus it is impossible for the cutter to damage the pusher roller.

The inner arms according to this invention have lateral extensions, and the displacement means includes cylinders between these extensions and the support.

According to further features of this invention the apparatus is provided with a drive roller engageable with a coil in the cradle, with means for urging this drive roller radially against the coil in the cradle, and with means for rotating the drive roller and thereby rotating the coil in the cradle. This structure is provided above the cradle and it can be swung up out of the way, like the pusher roller, to give free access to the equipment. The cradle according to this invention includes a pair of support rollers spaced apart by a distance smaller than the minimum coil diameter.

According to another feature of this invention the means for cutting includes a pair of shear blades one of which is movable along the cutting plane. It is also possible to use as cutting means a cutting torch movable along this plane. This cutting torch is itself carried on a carriage displaceable on the support frame.

DESCRIPTION OF THE DRAWING

The above and other objects, features, and advantages will become more readily apparent from the following, reference being made to the accompanying drawing in which:

FIGS. 3 and 4 are views similar to FIG. 1 illustrating variations on the apparatus of this invention.

SPECIFIC DESCRIPTION

Figure 1:
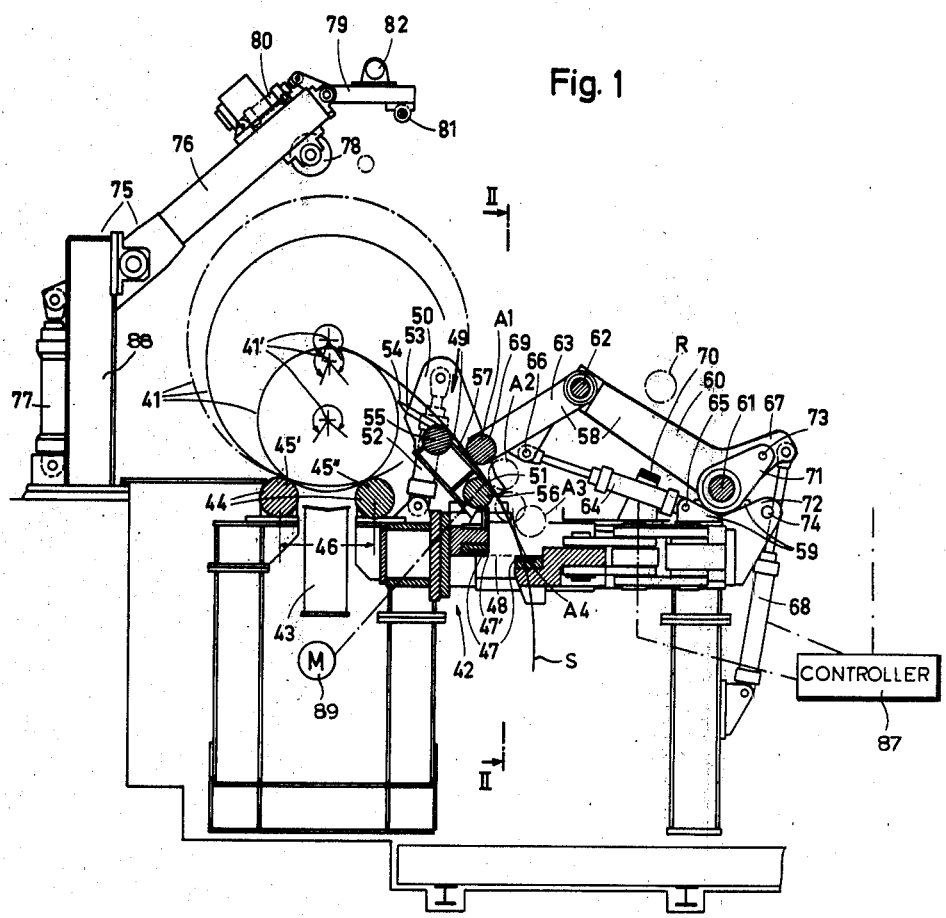
FIG. 1 is a side view partly in longitudinal section through an apparatus according to the instant invention.
Figure 2:
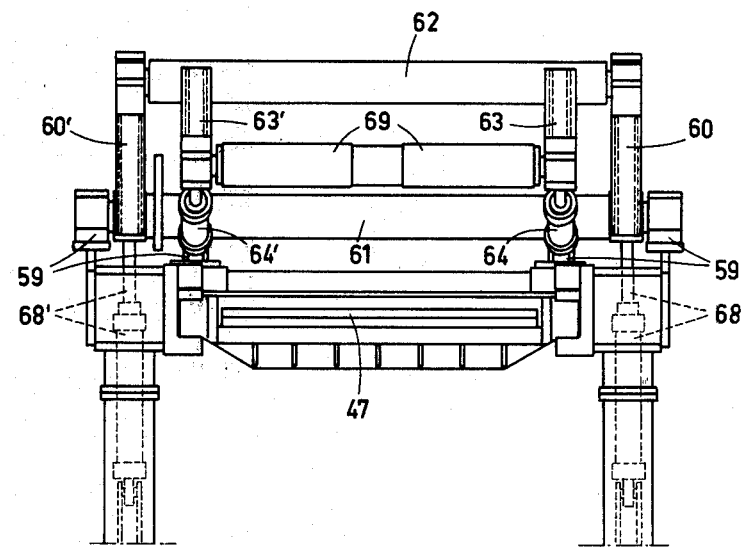
FIG. 2 is a cross section taken along the plane indicated by arrows II—II of FIG. 1.

As seen in FIGS. 1 and 2 an apparatus for cutting the end off a strip S wound on a coil 41 having a center axis 41' has a horizontally effective shear 42. Several different coils of different diameters are illustrated, two small ones in solid lines and one large one in dot-dash lines. The coil 41 can be transported by a standard walking-beam conveyor 43 into a cradle 44 formed by a pair of rollers 45' and 45" spaced apart by a distance 46 smaller than the minimum coil diameter so that a coil cannot fall through between them.

The shear 42 has a pair of shear blades 47 with edges 47' that can be brought together along a horizontal plane 48 in a manner well known in the art. A heavy duty crank arrangement is provided to reciprocate the right-hand movable blade 47 for cutting relatively heavy steel strip stock.

A strip guide 49 has a pair of end plates 50 carrying a downstream guide roller 56, an upstream guide roller 55, a table 57 extending between them, and a guide plate 5 having an upstream edge 54. Hydraulic cylinders 52 fixed to the frame 59 of the apparatus can pivot the guide assembly 49 about an axis 51 on which tkhe downstream roller 56 is centered to direct the plate 53 tangentially at the coil 41 in the cradle 44. Obviously as the coil diameter increases the assembly 49 is pivoted up, to the right in FIG. 1.

A rectangular or four-part linkage 58 has, as best seen by a comparison of FIGS. 1 and 2, a pair of inner arms 60 and 60' pivoted at an axle 61 on the frame 59 and having lateral extensions 67 connected via hydraulic cylinders 68 and 68' to the frame 59 so that these cylinders, which are controlled like the cylinders 52 from a central computer-type hydraulic controller 87 can pivot these arms 60 and 60' about the pivot shaft 61. The outer ends of these inner arms 60 and 60' are bridged by a horizontal axle 62 parallel to the shaft 61 and are connected to the inner ends of outer arms 63 and 63' whose outer ends in turn are bridged by a pusher roller 69 extending parallel to the axle 62 and shaft 61. As shown in FIG. 1 each of these outer arms 63 and 63' has a pivot 66 for the piston rod of a respective cylinder 64 and 64' pivoted at 65 on the frame or support 59 and also operated by the controller 87.

Abutments 70 are provided on the machine housing 59 for limiting the downward travel of the arms 60 and 60' to prevent the pusher roller 69 from taking a position on the plane 48 between the blades 47 where it could be damaged. In addition an arm 71 on the shaft 61 angularly fixed to the arms 60 and 60' is formed with a hole 73 that can be aligned in a fully back position of these arms 60 and 60' with a hole 74 of an arm 72 fixed on the housing 59 to allow the arms 60 to be locked in a fully back position R by insertion of a temporary lock pin through these holes 73 and 74. This last-described structure is a safety feature that insures that the linkage 58 will remain out of the way while someone is working on the structure below it.

In addition the system according to this invention is provided with a driven winding and unwinding device 75 shown only in FIG. 1. This has a main arm 76 pivotal about a horizontal axis on top of a support column 88 by means of a hydraulic cylinder 77 and carrying on its outer end a main press roller 78 and a shorter arm 79 carrying in turn a small magnetic roller 81 rotatable by means of a motor 82, with a cylinder 80 controlling the pivoting of the arm 79.

Figure 3:
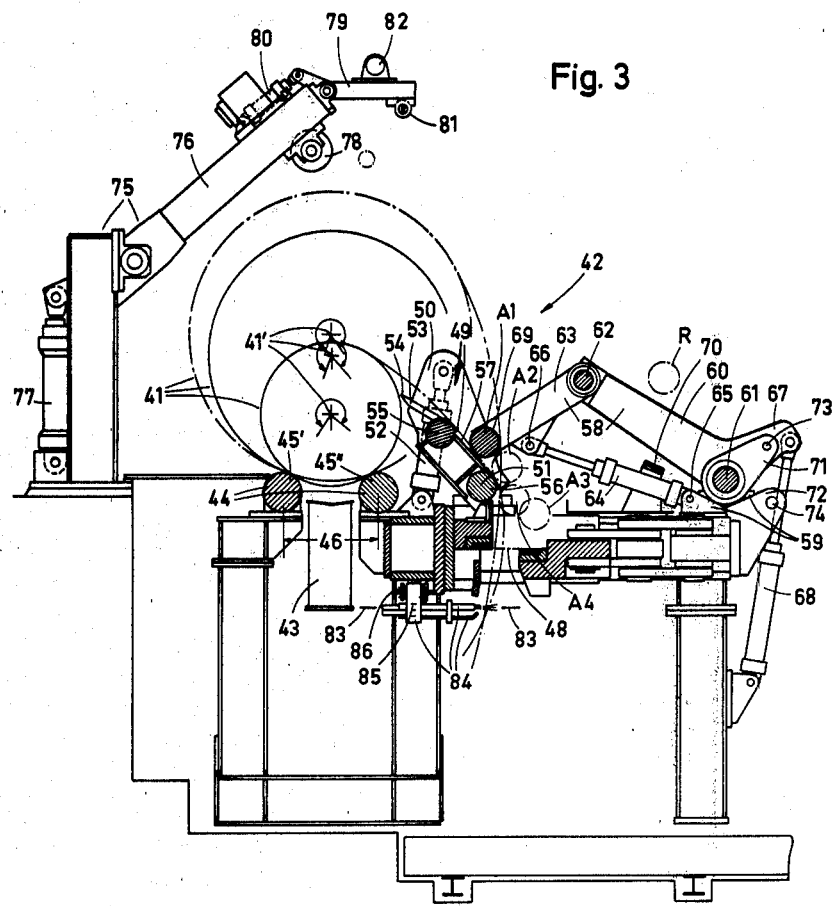

It is also possible as shown in FIG. 3, where like reference numerals refer to structure identical to that of FIG. 1, to provide the apparatus according to this invention with a cutting torch 84 effective along a plane 83 below the shear plane 48. This torch 84 is carried on a carriage movable along guides 86 of the frame 59 under the guidance of the controller 87.

It is also possible to eliminate the shear 42 altogether as shown in FIG. 4 and merely provide the torch 84 as sole cutting means. This system is used for very thick strip when the simple mechanical shear would not normally be able to sever it.

The systems described above function as follows:

A coil 41 is moved into position on the cradle rollers 45 and 45' by the conveyor 43 with its axis parallel to the axes of the various rollers 55, 56 and 69. The roller 78 is then pressed down against the coil 41 by the cylinder 77 and the roller 81 by the cylinder 80. The motor 82 then operates to rotate the coil 41 about its horizontal axis, with the magnetic roller 81 catching and pulling off the starting end of the strip S.

Meanwhile the cylinders 64, 64' and 68, 68' are fully retracted to hold the roller 69 in the position indicated at dot-dash lines at R. As the free end of the strip S is moved down these cylinders move the pusher roller 69 into the position shown at A3 to coact with the guide 49 to feed the strip end into the slot between the blades 47 and 47'. In this position the roller 69 acts to guide and hold down the strip to make sure that it is fed squarely to the cutter 42.

The guide 49 is meanwhile positioned to direct the table or plate 53 tangentially at the roll 41 so that the strip S moves smoothly down across it.

Once the strip is through the cutter slot the roller 69 is normally moved to the position indicated at A1 to act as a straightener with the rollers 55 and 56. The cut is made when the desired length of the strip S is through the cutter 42.

The roller 69 can be moved to the position A2 pinching the strip against the downstream guide roller 56 which is normally driven by means of a motor illustrated schematically at 89. This roller 56 can therefore be appropriately rotated to pull the strip off or wind the strip back up on the coil 41.

It is also possible for the roller to assume a position A4 in which it is again close to the roller 56 and in which it prevents the strip from bending back when it is being rewound after the cut is made. Thus in this position it ensures that the strip will be wound smoothly back up on the coil 41.

The system according to the instant invention therefore allows the roller 69 to be positioned at any appropriate location so that this roller takes the place of several rollers such as used in the prior-art systems. In addition it is possible for this inventive structure to be moved fully out of the way for servicing of the machine.

We claim:

1. An apparatus for cutting the end off a strip wound as a coil having a diameter lying between a predetermined maximum diameter and a predetermined minimum diameter, said apparatus comprising a fixed support;

a substantially horizontal support cradle for said coil on said support;

means on said support defining a vertically open gap spaced from said cradle for cutting said strip along a horizontal cutting plane as said strip passes down through said gap;

a guide on said support above and to one side of said gap between same and said cradle;

an inner pivot arm pivoted on said support about a horizontal inner axis and having an outer end;

an outer pivot arm pivoted on said outer end of said inner arm about a horizontal outer axis and having an outer end carrying a pusher; and means connected between said arms and said support for displacing said pusher horizontally and vertically above said plane relative to said guide for urging said pusher against said strip at said guide at any of several vertically offset locations therealong.

2. The apparatus defined in claim 1 wherein said guide comprises a guide-support table and a pair of vertically spaced guide rollers.

3. The apparatus defined in claim 2 wherein said apparatus has two such inner arms and two such outer arms, said pusher being a horizontal pusher roller interconnecting the outer ends of said outer arms, said apparatus further comprising a rigid horizontal pivot interconnecting the outer ends of said inner arms, whereby said arms, pusher roller, and pivot forming a rigid linkage.

4. The apparatus defined in claim 3 wherein said inner arms are parallel to each other and said outer arms are parallel to each other.

5. The apparatus defined in claim 4, further comprising means for rotating one of said guide rollers, said pusher roller being displaceable between a first position between said guide rollers and engaged against said strip, whereby the strip is straightened between said pusher and guide rollers.

a second position pinching said strip against said one guide roller, whereby said strip is positively advanced by said one guide roller, a third position below both of said guide rollers and engaged against said strip, and a fourth rest position out of engagement with said strip and spaced from said guide.

6. The apparatus defined in claim 5, further comprising means including a stop for limiting the downward displacement of said pusher roller to a level above said plane.

7. The apparatus defined in claim 5 wherein said inner arms have lateral extensions, said means for displacing including cylinders between said extensions and said support.

8. The apparatus defined in claim 2, further comprising:

a drive roller engageable with a coil in said cradle;

means for urging said drive roller radially against said coil in said cradle; and means for rotating said drive roller and thereby rotating said coil in said cradle.

9. The apparatus defined in claim 8 wherein said cradle includes a pair of support rollers spaced apart by a distance smaller than said minimum diameter.

10. The apparatus defined in claim 1 wherein said means for cutting includes a pair of shear blades one of which is movable along said plane.

11. The apparatus defined in claim 1 wherein said means for cutting includes a cutting torch movable along said plane.

12. The apparatus defined in claim 11 wherein said means for cutting includes a carriage displaceable on said support along said frame and carrying said torch.

* * * * *